United States Patent
Dannheisig et al.

(10) Patent No.: US 9,539,673 B2
(45) Date of Patent: Jan. 10, 2017

(54) WELDING METHOD HAVING A MAGNETIC WELDING CLAMPING DEVICE

(71) Applicant: Johnson Controls GmbH, Burscheid (DE)

(72) Inventors: Andreas Dannheisig, Sassenberg (DE); Johannes Kraus, Landstuhl (DE); Michael Hamers, Marburg (DE); Jörgen Von Bodenhausen, Köln (DE); Bernd Gross, Langenfeld (DE)

(73) Assignee: Johnson Controls GmbH, Burscheid (DE)

( * ) Notice: Subject to any disclaimer, the term of this patent is extended or adjusted under 35 U.S.C. 154(b) by 201 days.

(21) Appl. No.: 14/383,642

(22) PCT Filed: Mar. 7, 2013

(86) PCT No.: PCT/EP2013/054657
§ 371 (c)(1),
(2) Date: Sep. 8, 2014

(87) PCT Pub. No.: WO2013/132029
PCT Pub. Date: Sep. 12, 2013

(65) Prior Publication Data
US 2015/0021308 A1    Jan. 22, 2015

(30) Foreign Application Priority Data

Mar. 7, 2012 (DE) .......................... 10 2012 004 343
Jul. 10, 2012 (DE) .......................... 10 2012 013 582

(51) Int. Cl.
*B23K 9/00* (2006.01)
*B23K 37/04* (2006.01)

(52) U.S. Cl.
CPC ........... *B23K 37/04* (2013.01); *B23K 37/0435* (2013.01); *B23K 2203/20* (2013.01)

(58) Field of Classification Search
CPC . B23K 2203/20; B23K 37/04; B23K 37/0435; B23K 26/02; B23K 26/0342; B23K 26/21–26/282
USPC .................. 219/136, 137 R, 121.63
See application file for complete search history.

(56) References Cited

U.S. PATENT DOCUMENTS

| | | | | |
|---|---|---|---|---|
| 5,023,427 A | * | 6/1991 | Neiheisel | B23K 26/26 219/121.31 |
| 5,045,668 A | * | 9/1991 | Neiheisel | B23K 26/032 219/121.63 |
| 6,053,392 A | | 4/2000 | Aebersold et al. | |

FOREIGN PATENT DOCUMENTS

| | | |
|---|---|---|
| DE | 268 418 A1 | 5/1989 |
| DE | 10 2007 027 226 A1 | 12/2008 |
| DE | 10 2007 028 956 A1 | 12/2008 |
| DE | 10 2010 018 354 A1 | 10/2011 |
| EP | 0 743 133 A1 | 11/1996 |

* cited by examiner

*Primary Examiner* — Sang Y Paik
(74) *Attorney, Agent, or Firm* — McGlew and Tuttle, P.C.

(57) ABSTRACT

A method is provided in which two parts (2, 3) are connected to each other by a weld. The two parts (2, 3) are fixed by a magnet (4) during welding. A magnetic field of the magnet (4) influences the flow of a melt in the weld (6).

20 Claims, 1 Drawing Sheet

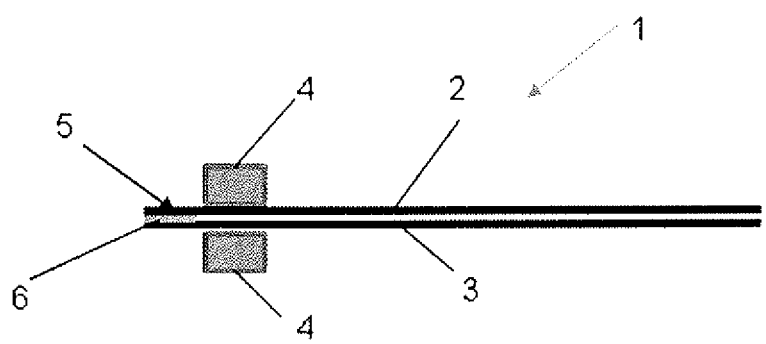

WELDING METHOD HAVING A MAGNETIC WELDING CLAMPING DEVICE

CROSS REFERENCE TO RELATED APPLICATIONS

This application is a United States National Phase Application of International Application PCT/EP2013/054657 filed Mar. 7, 2013 and claims the benefit of priority under 35 U.S.C. §119 of German Patent Applications DE 10 2012 004 343.0 filed Mar. 7, 2012 and DE 10 2012 013 582.3 filed Jul. 10, 2012, the entire contents of which are incorporated herein by reference.

FIELD OF THE INVENTION

The present invention relates to a method in which two components are connected to each other by means of a weld seam.

BACKGROUND OF THE INVENTION

Such welding methods are known from the prior art, for example, DE 10 2007 028 956 A1, DE 10 2007 027 226 A1, DD 268 418 and EP 0 743 133 A1. However, these welding methods do not enable operationally reliable clamping, in particular of very thin metal sheets, since, as a result of the flexibility thereof, undesirable fluctuations in the gap dimension occur. This results in very high undesirable rejection rates. Furthermore, in the event of a thermal connection operation, for example, laser welding, electron beam welding, CMT arc welding, in particular connection of non-identical materials, for example, aluminum/steel, there are formed in the melt bath intermetallic phases whose type and thickness are difficult to control but which have a decisive influence on the stability and the fatigue strength of the connection.

SUMMARY OF THE INVENTION

An object of the present invention was therefore to provide a welding method which is particularly suitable for the connection of thin metal sheets and with which reproducible connections can be achieved.

The object is achieved with a method in which two components are connected to each other by means of a weld seam and in which the two components are fixed by means of a magnet during the welding operation, the magnetic field of this magnet influencing the flow of melt in the weld seam.

According to the invention, the components to be connected, in particular metal sheets, are fixed during the thermal connection operation by means of a magnetic force, in particular held together and/or connected to each other so that between the components to be connected, a small, uniform gap dimension is produced. The magnetic force is preferably provided over a very large surface-area so that a consistent small gap dimension is produced between the components to be connected.

The magnet by means of which the magnetic force is provided may be a permanent magnet or an electromagnet. Preferably, at least one electromagnet is used whose field strength can be adjusted. In the event that one of the components to be connected has ferromagnetic properties, this component can be directly attracted by the magnet. The other component to be connected is then arranged between this ferromagnetic component and the magnet. If neither of the two components to be connected has ferromagnetic properties, there is preferably provided a ferromagnetic clamping element which is attracted by the magnet and which draws together the two components to be connected.

During a thermal connection operation, in particular during laser welding, there is often produced as a result of the thermal energy introduced a so-called melt bath which generally has melt, that is to say, liquid metal, of both components which are intended to be connected. According to the invention, the magnetic field of the clamping device is now used at the same time to influence the flow in the melt bath and consequently the local composition and/or the local metal structure of the resulting weld seam. For example, the magnetic field can be used to homogenize the melt bath, and/or in order to influence the divergence/convergence. However, according to a preferred embodiment of the present invention, the magnetic field is used to achieve a very specific concentration and/or structure gradient in the melt bath and consequently in the resulting weld seam. The quality, that is to say, the local chemical composition and/or the local structure, of the resulting weld seam can thereby be influenced in a selective manner. The magnetic field does not serve to prevent the melt from running away. With the method according to the invention, the quality, that is to say, the local chemical composition and/or the local structure, of the resulting weld seam can be influenced in a selective manner.

Preferably, the method according to the invention is used for the connection of very thin metal sheets. In particular, the method according to the invention is suitable for connecting two components which comprise different materials, for example, aluminum and steel. With the method according to the invention, it is possible to achieve very uniform, readily reproducible connections between the components to be joined together.

Preferably, the magnetic field is changed during the welding operation. The change may relate to the strength of the magnetic field and/or the direction thereof.

Preferably, the magnetic field extends over the entire length of the weld seam.

Preferably, the influence of the magnetic field on the melt is interrupted only when it has hardened sufficiently, that is to say, when the structure thereof has hardened to such an extent that it no longer changes or changes only slightly.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a sectional view showing a welding clamping device by means of which a first component and a second component are connected by means of a weld seam.

DESCRIPTION OF THE PREFERRED EMBODIMENTS

Referring to the drawings in particular, FIG. 1 shows a welding clamping device by means of which a first component 2 and a second component 3 are connected by means of a weld seam 6. The first component 2 is, for example, an aluminum metal sheet and the second component 3 is a steel metal sheet. In particular, the metal sheets 2, 3 are constructed as very thin metal sheets. These two metal sheets are pressed together preferably in an extensive manner by means of the clamping device 4 which is provided so as to be magnetic according to the invention so that, during welding using the welding device 5, for example, the laser, only a small uniform welding gap is present. The clamping device 4 comprises in the present case a magnet, in particular an electromagnet, and a ferromagnetic clamping piece which is attracted by the magnet and thereby presses the components 2, 3 together. The person skilled in the art understands that the ferromagnetic clamping piece can be dispensed with if one of the components 2, 3 has ferromagnetic properties. As a result of the introduction of energy during the welding operation, for example, by a laser 5, the first and/or the second component 2, 3 is/are at least partially locally melted in the region of the subsequent weld seam so that a melt bath 6 is produced. According to the invention, the magnetic field of the magnet 4 is used to influence a flow in the melt bath 6, in particular during the welding operation. The local composition and/or the local structure of the resulting weld seam can thereby be influenced. There is preferably no provision for the magnetic field to prevent or reduce loss of the welding bath. The magnetic field of the magnet 4 can be changed during the welding operation. For example, the strength of the magnetic field can be decreased or increased during the welding operation.

While specific embodiments of the invention have been shown and described in detail to illustrate the application of the principles of the invention, it will be understood that the invention may be embodied otherwise without departing from such principles.

The invention claimed is:

1. A method for connecting two components to each other during a welding operation by means of a weld seam, the method comprising the steps of:
    fixing the two components with a magnet during the welding operation, the magnet being provided by a clamping device which presses the components together in an extensive manner, wherein by using the magnet, a gap with a constant width is produced between the two components; and
    influencing, with a magnetic field of the magnet, the flow of melt in the weld seam.

2. The method as claimed in claim 1, wherein the flow homogenizes the melt.

3. The method as claimed in claim 2, wherein the magnetic field is changed during the welding operation.

4. The method as claimed in claim 2, wherein a portion of the clamping device is provided on a first side of one of the components and another portion of the clamping device is provided on a first side of another one of the components, wherein a second side of the one of the components and a second side of the another one of the components define the gap, the second side of the one of the components being opposite the first side of the one of the components, the second side of the another one of the components being located opposite the first side of the another one of the components.

5. The method as claimed in claim 2, wherein the magnetic field extends over the entire length of the weld seam.

6. The method as claimed in claim 2, wherein an influence of the magnetic field on the melt is interrupted only when the melt has hardened sufficiently.

7. The method as claimed in claim 1, wherein the magnetic field is changed during the welding operation.

8. The method as claimed in claim 7, wherein a portion of the clamping device is provided on a first side of one of the components and another portion of the clamping device is provided on a first side of another one of the components, wherein a second side of the one of the components and a second side of the another one of the components define the gap, the second side of the one of the components being opposite the first side of the one of the components, the second side of the another one of the components being located opposite the first side of the another one of the components.

9. The method as claimed in claim 7, wherein the magnetic field extends over the entire length of the weld seam.

10. The method as claimed in claim 7, wherein an influence of the magnetic field on the melt is interrupted only when the melt has hardened sufficiently.

11. The method as claimed in claim 1, wherein a portion of the clamping device is provided on a first side of one of the components and another portion of the clamping device is provided on a first side of another one of the components, wherein a second side of the one of the components and a second side of the another one of the components define the gap, the second side of the one of the components being opposite the first side of the one of the components, the second side of the another one of the components being located opposite the first side of the another one of the components.

12. The method as claimed in claim 11, wherein the magnetic field extends over the entire length of the weld seam.

13. The method as claimed in claim 11, wherein an influence of the magnetic field on the melt is interrupted only when the melt has hardened sufficiently.

14. The method as claimed in claim 1, wherein the magnetic field extends over the entire length of the weld seam.

15. The method as claimed in claim 14, wherein an influence of the magnetic field on the melt is interrupted only when the melt has hardened sufficiently.

16. The method as claimed in claim 1, wherein an influence of the magnetic field on the melt is interrupted only when the melt has hardened sufficiently.

17. A welding method comprising:
    providing two components that are to be connected to each other;
    providing a clamping device comprising a magnet, said magnet producing a magnetic force;
    pressing said components with a pressing force via said clamping device such that a gap with a constant width is produced between the two components, wherein the two components are fixed relative to each other via at least said magnetic force to maintain the constant width of said gap between the two components;
    influencing a flow of melt in a weld seam of the fixed two components with a magnetic field of the magnet.

18. The method as claimed in claim 17, wherein:
    the magnetic field is changed during the welding operation; and
    an influence of the magnetic field on the melt is interrupted only when the melt has hardened sufficiently.

19. The method as claimed in claim 17, wherein a portion of the clamping device is provided on a first side of one of the components and another portion of the clamping device is provided on a first side of another one of the components, wherein a second side of the one of the components and a second side of the another one of the components define the gap, the second side of the one of the components being opposite the first side of the one of the components, the second side of the another one of the components being located opposite the first side of the another one of the components.

20. The method as claimed in claim 17, wherein the magnetic field extends over the entire length of the weld seam.

\* \* \* \* \*